United States Patent
Mylius et al.

(10) Patent No.: US 9,336,003 B2
(45) Date of Patent: May 10, 2016

(54) MULTI-LEVEL DISPATCH FOR A SUPERSCALAR PROCESSOR

(71) Applicant: Apple Inc., Cupertino, CA (US)

(72) Inventors: John H. Mylius, Gilroy, CA (US); Gerard R. Williams, III, Los Altos, CA (US); Shyam Sundar Balasubramanian, Santa Clara, CA (US); Conrado Blasco-Allue, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 659 days.

(21) Appl. No.: 13/749,999

(22) Filed: Jan. 25, 2013

(65) Prior Publication Data

US 2014/0215188 A1   Jul. 31, 2014

(51) Int. Cl.
  *G06F 9/30*   (2006.01)
  *G06F 9/38*   (2006.01)
  *G06F 9/48*   (2006.01)

(52) U.S. Cl.
  CPC .......... *G06F 9/3836* (2013.01); *G06F 9/30145* (2013.01); *G06F 9/4881* (2013.01); *G06F 9/4887* (2013.01)

(58) Field of Classification Search
  None
  See application file for complete search history.

(56) References Cited

U.S. PATENT DOCUMENTS

| | | | | |
|---|---|---|---|---|
| 5,649,225 A * | 7/1997 | White | .................. | G06F 9/30032 712/1 |
| 5,689,674 A * | 11/1997 | Griffith | .................. | G06F 9/3836 712/214 |
| 5,748,978 A | 5/1998 | Narayan et al. | | |
| 5,859,992 A | 1/1999 | Tran et al. | | |
| 5,867,682 A * | 2/1999 | Witt | .................... | G06F 9/30014 711/147 |
| 5,893,921 A | 4/1999 | Bucher et al. | | |
| 6,209,081 B1 * | 3/2001 | Kahle | ................... | G06F 9/3836 712/215 |
| 6,260,138 B1 | 7/2001 | Harris | | |
| 6,393,550 B1 * | 5/2002 | Fetterman | ........... | G06F 9/30167 712/214 |
| 6,535,973 B1 * | 3/2003 | Cheong | .................. | G06F 9/3836 712/216 |
| 7,243,217 B1 * | 7/2007 | Oliver | ................... | G06F 9/3001 712/222 |
| 7,366,878 B1 * | 4/2008 | Mills | .................... | G06F 9/3838 712/214 |
| 8,006,073 B1 * | 8/2011 | Ali | ........................ | G06F 9/3851 712/220 |
| 8,090,931 B2 * | 1/2012 | Col | ..................... | G06F 9/30043 712/218 |

(Continued)

*Primary Examiner* — Steven Snyder
(74) *Attorney, Agent, or Firm* — Meyertons, Hood, Kivlin, Kowert & Goetzel, P.C.; Lawrence J. Merkel (57) ABSTRACT

In an embodiment, a processor includes a multi-level dispatch circuit configured to supply operations for execution by multiple parallel execution pipelines. The multi-level dispatch circuit may include multiple dispatch buffers, each of which is coupled to multiple reservation stations. Each reservation station may be coupled to a respective execution pipeline and may be configured to schedule instruction operations (ops) for execution in the respective execution pipeline. The sets of reservation stations coupled to each dispatch buffer may be non-overlapping. Thus, if a given op is to be executed in a given execution pipeline, the op may be sent to the dispatch buffer which is coupled to the reservation station that provides ops to the given execution pipeline.

24 Claims, 5 Drawing Sheets

(56) References Cited

U.S. PATENT DOCUMENTS

| | | |
|---|---|---|
| 8,275,976 B2 | 9/2012 | Glew |
| 9,043,581 B2 * | 5/2015 | Ukai .................. G06F 9/30141 712/214 |
| 2003/0131043 A1 * | 7/2003 | Berg ....................... G06F 9/544 718/104 |
| 2004/0064678 A1 | 4/2004 | Black et al. |
| 2009/0172362 A1 * | 7/2009 | Shen ..................... G06F 9/3851 712/220 |
| 2009/0287907 A1 * | 11/2009 | Isherwood ............ G06F 9/3867 712/205 |
| 2010/0070741 A1 * | 3/2010 | Col ..................... G06F 9/30043 712/211 |
| 2013/0326198 A1 * | 12/2013 | Meier ................... G06F 9/3834 712/216 |
| 2015/0324204 A1 * | 11/2015 | Eisen ................... G06F 9/3867 712/215 |
| 2015/0324206 A1 * | 11/2015 | Eisen ................... G06F 9/3867 712/215 |

* cited by examiner

MULTI-LEVEL DISPATCH FOR A SUPERSCALAR PROCESSOR

BACKGROUND

1. Field of the Invention

This invention is related to the field of processors and, more particularly, to dispatching instructions in processors.

2. Description of the Related Art

A processor is generally hardware circuitry designed to execute the instructions defined in a particular instruction set architecture implemented by the processor. A sequence of instructions as defined in the instruction set architecture can be provided to the processor to implement desired functionality in a system that includes the processor. Accordingly, the performance of the system is at least partially dependent on the rate at which the processor can successfully execute the instructions in the sequence.

The rate at which instructions are executed can be increased by designing the processor to operate at high clock rates, where the clock is the signal which controls the capture and launch of digital signals in the processor circuitry. Additionally, by providing parallel pipelines in the processor circuitry, multiple instructions can be processed concurrently. To supply a large number of parallel pipelines (a "wide issue" processor), a relatively large number of instructions need to be fetched and prepared for execution each clock cycle (on average). The challenges related to locating large numbers of instructions quickly can put pressure on the ability to maintain a high clock cycle rate (or frequency).

SUMMARY

In an embodiment, a processor includes a multi-level dispatch circuit configured to supply operations for execution by multiple parallel execution pipelines. The multi-level dispatch circuit may include multiple dispatch buffers, each of which is coupled to multiple reservation stations. Each reservation station may be coupled to a respective execution pipeline and may be configured to schedule instruction operations (ops) for execution in the respective execution pipeline. The sets of reservation stations coupled to each dispatch buffer may be non-overlapping. Thus, if a given op is to be executed in a given execution pipeline, the op may be sent to the dispatch buffer which is coupled to the reservation station that provides ops to the given execution pipeline.

Because each dispatch buffer provides ops to multiple reservation stations, the selection of dispatch buffers to capture ops (when provided in relatively large numbers from the logic that prepares the ops for execution) may be simpler than attempting to transmit ops to reservation stations directly. Furthermore, the mechanisms for choosing dispatch buffers to receive ops, and for choosing reservation stations to receive ops from the dispatch buffers, may be designed to approximate the transmission of each op to the reservation station that has the most available entries among the reservation stations that are eligible to receive that op. The multi-level dispatch apparatus may permit higher frequency operation than might otherwise be possible and may also provide large numbers of ops, on average, to the parallel pipelines for processing. In some embodiments, evenly distributing the ops to the reservation stations may lead to high performance in the processor. The multi-level dispatch apparatus may approximate the even distribution (on average) while relieving the timing pressures that accompany a wide-issue superscalar processor that includes numerous reservation stations.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Figure 1:
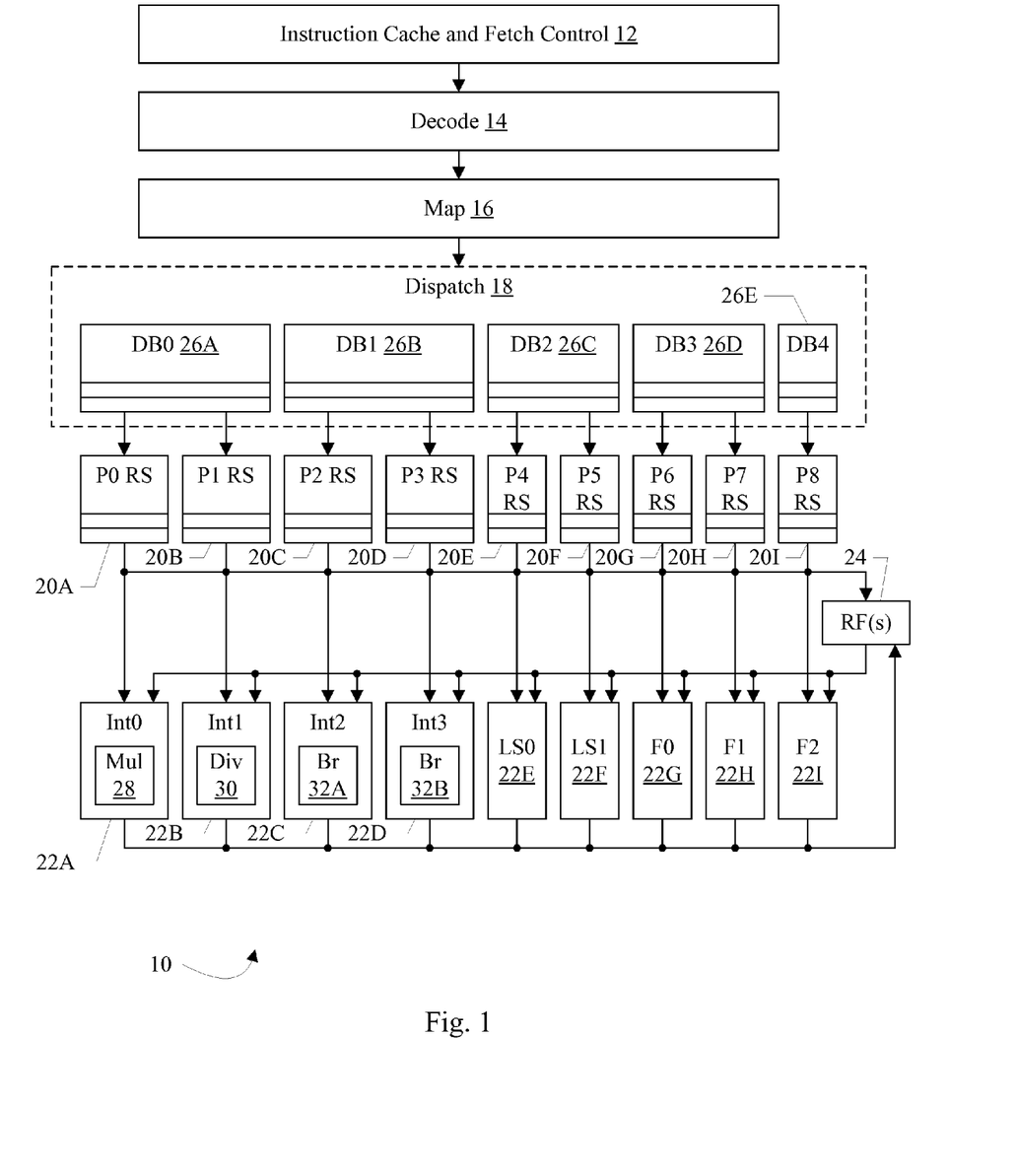
FIG. 1 is a block diagram of one embodiment of a processor.

Turning now to FIG. 1, a block diagram of one embodiment of a portion of a processor 10 is shown. In the illustrated embodiment, the processor 10 includes an instruction cache and fetch control unit 12, a decode unit 14, a map unit 16, a dispatch unit 18, a set of reservation stations 20A-20I, a set of execution units 22A-22I, and one or more register files 24. The instruction cache and fetch control unit 12 is coupled to the decode unit 14, which is coupled to the map unit 16. The map unit 16 is coupled to the dispatch unit 18, which is further coupled to the reservation stations 20A-20I. The reservation stations 20A-20I are coupled to respective execution units 22A-22I and the register file(s) 24. The register file(s) 24 are further coupled to the execution units 22A-22I.

More particularly, in FIG. 1, the dispatch unit 18 may include a set of dispatch buffers 26A-26E. Each of the dispatch buffers 26A-26D is coupled to multiple reservation stations, as shown in FIG. 1. That is, in the illustrated embodiment, the dispatch buffer 26A is coupled to the reservation stations 20A-20B; the dispatch buffer 26B is coupled to the reservation stations 20C-20D; the dispatch buffer 26C is coupled to the reservation stations 20E-20F; and the dispatch buffer 26D is coupled to the reservation stations 20G-20H. Because there is an odd number of reservation stations and the dispatch buffers 26A-26D are coupled to two reservation stations each, the dispatch buffer 26E is coupled to one reservation station 20I. In other embodiments, the reservation station 20I may also be coupled to the dispatch buffer 26D and thus the dispatch buffer 26E may not be required in such embodiments. Coupling two reservation stations per dispatch buffer is merely exemplary, other embodiments may implement more than two reservation stations per dispatch buffer, if desired.

Providing the dispatch buffers may provide a multi-level dispatch from the decode/mapping of ops to the reservation stations. The relatively large number of ops that may be received concurrently in a clock cycle at the dispatch unit 18 may be distributed to the smaller number of dispatch buffers, which may redistribute the ops to the more numerous reservation stations. Thus, a high instruction operation bandwidth into the dispatch unit 18 may be maintained, which may help ensure that the execution units 22A-22I are used efficiently. Additionally, the timing complexities of spreading the large number of ops over the large number of reservation stations may be alleviated in the multi-level scheme.

In the illustrated embodiment, ops may be captured by the dispatch buffers 26A-26E based on the type of op (e.g. integer, load/store, or floating point in this embodiment). Load/store ops may be captured by the dispatch buffer 26C, which is coupled to both load/store reservation stations 20E-20F, which are further coupled to the two load/store execution units 22E-22F. Integer ops may be captured by either the dispatch buffer 26A or 26B. Similarly, floating point ops may be captured by either the dispatch buffer 26D or 26E. Each of the dispatch buffers 26A-26E may be configured to accept up to the maximum number of concurrently-provided ops from the map unit 16, so if the concurrently-provided ops are all of the same type and are all allocated to the same dispatch buffer 26A-26E, they may all be accepted (assuming the dispatch buffer has enough open entries to accept all the ops).

Among ops of a given type, more than one of the dispatch buffers 26A-26E may be eligible to receive the ops. For example, integer ops may be received by either dispatch buffer 26A or dispatch buffer 26B. Some ops may be restricted to a particular dispatch buffer, dependent on the hardware implemented in the corresponding execution units. For example, the integer execution unit 22A may be the only integer execution unit with a multiplier in this embodiment (multiplier 28 in FIG. 1). Similarly, the integer execution unit 22B may be the only integer execution unit with a divider in this embodiment (divider 30 in FIG. 1). The integer execution units 22C-22D may be the only units having branch processing circuitry (branch circuitry 32A-32B in FIG. 1). Other integer ops (e.g. add/subtract ops, logical ops, shift/rotate ops, etc.) may be executed by any execution unit 22A-22D. Other embodiments may include different hardware definitions and different numbers of execution units having specific execution hardware, as desired.

Accordingly, for the embodiment of FIG. 1, multiply and divide ops may be restricted to the dispatch buffer 26A, and branch ops may be restricted to the dispatch buffer 26B.

Generally, an op that is restricted to a given dispatch buffer may be required to be allocated to that dispatch buffer, so that the op may be successfully executed. Ops that are restricted may be referred to as statically-assigned ops, because the assignment of the op to a given dispatch buffer is determined based on the definition of the op itself and the hardware definition of the execution units in the processor 10. Other ops, which may be freely assigned to any dispatch buffer that accepts ops of the given type (integer, load/store, or floating point), are referred to as dynamically-assigned ops. In the present embodiment, integer ops that are not multiply, divide, or branch ops are dynamically-assigned ops. Floating point ops may also be dynamically-assigned to the dispatch buffers 26D-26E. In this embodiment, the floating point execution units 22G-22I may be symmetrical and may be configured to execute any floating point ops.

While the allocation of statically-assigned ops to dispatch buffers may be known and fixed, a mechanism for allocating dynamically-assigned ops may be implemented in an attempt to balance a load of ops among the dispatch buffers 26A-26E and the corresponding reservation stations 20A-20I and execution units 22A-22I. The mechanism implemented according to one embodiment may attempt to approximate a mechanism in which dynamically-assigned ops concurrently transmitted to the dispatch unit 18 (in the absence of the multi-level dispatch structure of the present processor 10) are allocated to reservation stations 20A-20I of the correct type based on which reservation stations 20A-20I have the fewest ops stored therein. Thus, a first dynamically-assigned integer op received by the dispatch unit 18 would be allocated to the reservation station 20A-20D having the fewest number of ops (the most available space). A second dynamically-assigned integer op would be allocated to the reservation station 20A-20D having the next fewest number of ops, etc.

In an embodiment, the mechanism may include allocating the first dynamically-assigned integer op based on the relative fullness of dispatch buffers 26A-26B. The relative fullness may include measuring the fullness of the corresponding reservation stations 20A-20D. Thus, a first dispatch buffer may itself be less full than a second dispatch buffer, but if the corresponding reservation stations are more full for the first dispatch buffer than the corresponding reservation stations for the second dispatch buffer, the relative fullness of the first dispatch buffer may be greater than the relative fullness of the second dispatch buffer. Viewed in another way, the relative fullness of a given dispatch buffer may be a measure of the number of ops that are awaiting execution by the execution units associated with the dispatch buffer. Based on the relative fullness, the first dynamically-assigned integer op may be assigned to the less full dispatch buffer 26A-26B (the dispatch buffer 26A-26B having more free space). The next concurrently-received dynamically-assigned integer op (if any), may be assigned to the other dispatch buffer 26A-26B. Additional concurrently-received dynamically-assigned integer ops may be assigned on an alternating basis between the dispatch buffers 26A-26B.

The dispatch unit 18 may be configured to manage the dispatch buffers 26D-26E in a manner similar to the discussion above with regard to the dispatch buffers 26A-26B. In an embodiment in which the floating point execution units 22G-22I are symmetrical, all floating point ops may be dynamically-assigned ops. In an embodiment, since the dispatch buffer 26E serves one reservation station 20I and the dispatch buffer 26D serves two reservation stations 20G-20H, the allocation of floating point ops between the dispatch buffers 26D-26E may include sending one half as many ops to the dispatch buffer 26E as are sent to the dispatch buffer 26D, on average. That is, one third of the floating point ops may be allocated to the dispatch buffer 26E and two thirds of the floating point ops may be allocated to the dispatch buffer 26D, on average.

In this embodiment, the dispatch buffer 26C is the only dispatch buffer for load/store ops. Accordingly, load/store ops may be statically-assigned to the dispatch buffer 26C.

Each dispatch buffer 26A-26E may transmit ops to the corresponding reservation stations as well. In one embodiment, the dispatch unit 18 may be configured to attempt to transmit the first available op from a given dispatch buffer 26A-26E to the corresponding reservation station coupled to that dispatch buffer which has the most available entries (fewest ops), assuming the op is dynamically-assigned. If a second op is ready to be sent, the dispatch unit may be configured to transmit the op to the other reservation station.

The instruction cache and fetch control unit 12 may be configured to cache instructions previously fetched from memory, and may be configured to speculatively fetch a stream of instructions for the processor 10. The instruction cache and fetch control unit 12 may implement various prediction structures to predict the fetch stream. For example, a next fetch predictor may be used to predict fetch addresses based on previously executed instruction streams. Branch predictors of various types may be used to verify the next fetch prediction, or may be used to predict next fetch addresses if the next fetch predictor is not used.

The decode unit 14 may be configured to decode the instructions into instruction operations that are executable by the execution units 22A-22I. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 10 may be decoded into a single instruction operation, and thus the instruction operation may be essentially synonymous with instruction (although it may be modified in form by the decoder). As mentioned previously, the term "instruction operation" may be more briefly referred to here as "op."

The map unit 16 may be configured to perform register renaming on the ops, assigning physical registers in the register files 24 for each source and destination register in the ops. Embodiments which do not implement register renaming may eliminate the map unit 16.

The reservation stations 20A-20I may each store ops to be executed by a corresponding execution unit 22A-22I. That is, in this embodiment, there is a one-to-one correspondence between reservation stations 20A-20I and execution units 22A-22I. The reservation stations 20A-20I may be configured to track dependencies of the ops stored therein, and may be configured to schedule ops for which the dependencies have been satisfied (or are currently being satisfied by an executing op which will forward the result data to the op). In this embodiment, the reservation stations 20A-20I may track dependencies but may not actually capture operand data. Instead, a register file read in the register files 24 may be used to read the operand data (and there may be forwarding paths for results generated by the execution units 22A-22I). Thus, the reservation stations 20A-20I may include storage implementing a number of entries for ops (e.g. random access memory arrays, flops, registers, etc.) as well as control circuitry configured to track/resolve dependencies and to schedule ops. Other embodiments may be configured to capture the operand data in the reservation stations as well. In such embodiments, the register files 24 may be read as each op enters the reservation stations 20A-20I, and forwarded results may be captured by the reservation stations 20A-20I in addition to the register files 24 updating with the forwarded results.

The register files 24 may be one or more sets of physical registers which may be mapped to the architected registers coded into the instructions stored in the instruction cache and fetch control unit 12. There may be separate physical registers for different operand types (e.g. integer, media, floating point, etc.) in an embodiment. In other embodiments, the physical registers may be shared over operand types. The register files 24 may be configured to output operands read in response to ops issued for execution by the reservation stations 20A-20I to the respective execution units 22A-22I. The register files 24 may also be configured to capture results generated by the execution cores 22A-22I and written to the destination registers of the ops.

The integer execution units 22A-22D may be configured to execute integer ops. Generally, an integer op is an op which performs a defined operation on integer operands. Integers may be numeric values in which each value corresponds to a mathematical integer. As mentioned previously, the integer execution unit 22A may include the multiplier 28, while the integer execution unit 22B may include the divider 30. The integer execution units 22C-22D may include respective branch processing hardware 32A-32B to process branch ops. Each of the integer units 22A-22D may included adder hardware, shift/rotate hardware, logical operation hardware, etc. to perform the dynamically-assigned integer operations.

The load/store execution units 22E-22F may be configured to execute load/store ops. Generally, a load op may specify a transfer of data from a memory location to a register, while a store op may specify a transfer of data from a register to a memory location. The load/store execution units 22E-22F may include load queues, store queues, and/or load/store queues to handle load/store ops that have generated memory addresses but are awaiting cache fills or to commit data to the cache or memory. A data cache, not shown, may be coupled to the load/store execution units 22E-22F and may be accessed to complete load/store ops without transmission to the memory subsystem in the case of a cache hit.

The floating point execution units 22G-22I may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

While the illustrated embodiment includes particular numbers of execution units of various types, other embodiments may include different numbers of execution units, as desired. Additional execution units of other types may also be included (e.g. media units). Generally, media units may be configured to execute media ops. Media ops may be ops that have been defined to process media data (e.g. image data such as pixels, audio data, etc.). Media processing may be characterized by performing the same processing on significant amounts of data, where each datum is a relatively small value (e.g. 8 bits, or 16 bits, compared to 32 bits to 64 bits for an integer). Thus, media ops often include single instruction-multiple data (SIMD) or vector operations on an operand that represents multiple media data.

Each execution unit may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit 22A-22I may be an independent pipe for executing ops. The reservation stations 20A-20I may be part of the independent pipe with the corresponding execution unit 22A-22I.

Figure 2:
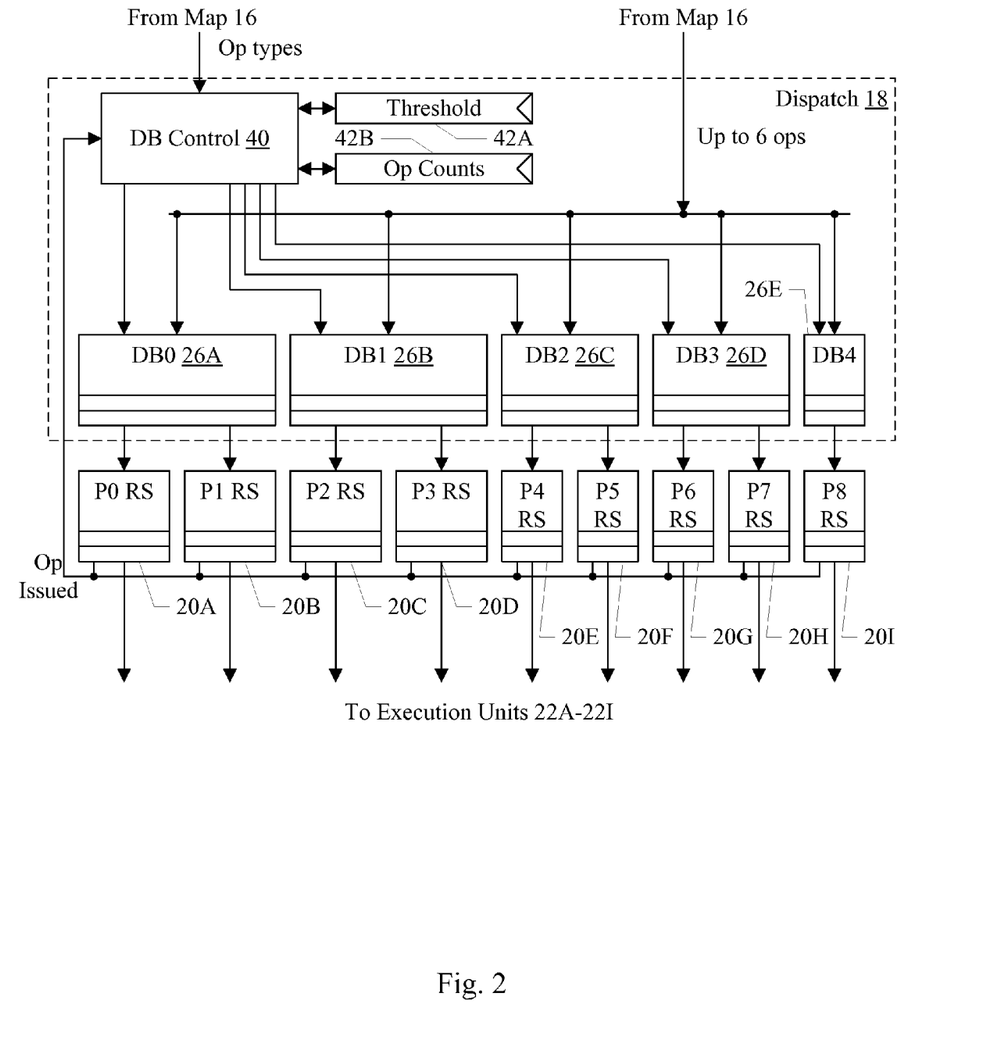
FIG. 2 is a block diagram of one embodiment of a dispatch unit and reservation stations, shown in greater detail.

Turning now to FIG. 2, a block diagram illustrating one embodiment of the dispatch unit 18 in greater detail is shown along with the reservation stations 20A-20I. In the illustrated embodiment, the dispatch unit 18 includes the dispatch buffers 26A-26E coupled to receive up to 6 ops concurrently from the map unit 16 and a dispatch buffer control circuit 40 coupled to the dispatch buffers 26A-26E and to receive op type indications from the map unit 16. The control circuit 40 is further coupled to control registers 42A-42B and to receive op issued indications from the reservation stations 20A-20I.

The control circuit 40 may be configured to control the allocation of ops to dispatch buffers 26A-26E, and the dispatch of ops from the dispatch buffers 26A-26E to the reservation stations 20A-20I. Thus, the control circuit 40 may implement the operation described above with regard to FIG. 1 for allocating and dispatching ops. Additional details for one embodiment are provided below as well with regard to the flowcharts of FIGS. 3 and 4.

As mentioned previously, the dispatch unit 18 may be configured to allocate ops to dispatch buffers based on relative fullness, including the number of ops in the corresponding reservation stations. Accordingly, the dispatch unit 18 may be configured to maintain op counts in the control register 42B. In one embodiment, the dispatch unit 18 may maintain an op count corresponding to each dispatch buffer 26A-26E. The op count may be the count of ops in that dispatch buffer 26A-26E and in the corresponding reservation stations 20A-20I to which that dispatch buffer is coupled. Alternatively, an embodiment may maintain separate op counts for each reservation station 20A-20I and for each dispatch buffer 26A-26E. There may be more than one register 42B to maintain the counts. In other embodiments, the reservation stations 20A-20I may provide the counts, rather than the dispatch unit 18 maintaining the counts.

The control circuit 40 may be configured to increment the op counts as ops are captured in the corresponding dispatch buffer 26A-26E, and to decrement the op counts in response to issuance of ops to the corresponding execution units 22A-22I. The op issued indications may include, e.g., a signal from each reservation station 20A-20I which may be asserted to indicate that the reservation station has issued an op.

To assign ops to dispatch buffers 26A-26E, the control circuit 40 may implement the mechanism described above with respect to FIG. 1. Additionally, in an embodiment, the control circuit 40 may implement a programmable threshold in the control register 42A. If the difference in relative fullness of the dispatch buffers 26A-26E of a given type exceeds the threshold, the control circuit 40 may allocate all of the dynamically-assigned ops of that type to the less full dispatch buffer until the difference falls below the threshold. Other embodiments may allocate more ops to the less full dispatch buffer, but not all, when the threshold has been exceeded.

The dispatch buffers 26A-26E may be formed from any type of storage (e.g. memory arrays, flops, registers, etc.). The dispatch buffers 26A-26E may be arranged as sets of entries, each entry configured to store one op and related state. The dispatch buffers 26A-26E may each be configured to capture up to the maximum number of ops that may be concurrently provided by the map unit 16 in a clock cycle (e.g. 6 in the embodiment of FIG. 2). Thus, each dispatch buffer 26A-26E may include a number of write ports equal to the maximum number. The control circuit 40 may provide control signals (e.g. write enables) for each write port based on the op types and the allocation of the ops to the dispatch buffers 26A-26E determined by the control circuit 40.

The op types provided by the map unit 16 may identify each op according to integer, load/store, or floating point. In addition, in embodiments which have statically-assigned ops such as the multiply, divide, and branch ops, the op types may identify the statically-assigned ops. The op types may specifically identify which statically-assigned op is being provided, or may identify which dispatch buffer 26A-26E the op is statically assigned to, in various embodiments.

The registers 42A-42B may be formed from any sort of clocked storage devices (e.g. flops, registers, latches, etc.) in various embodiments.

Figure 3:
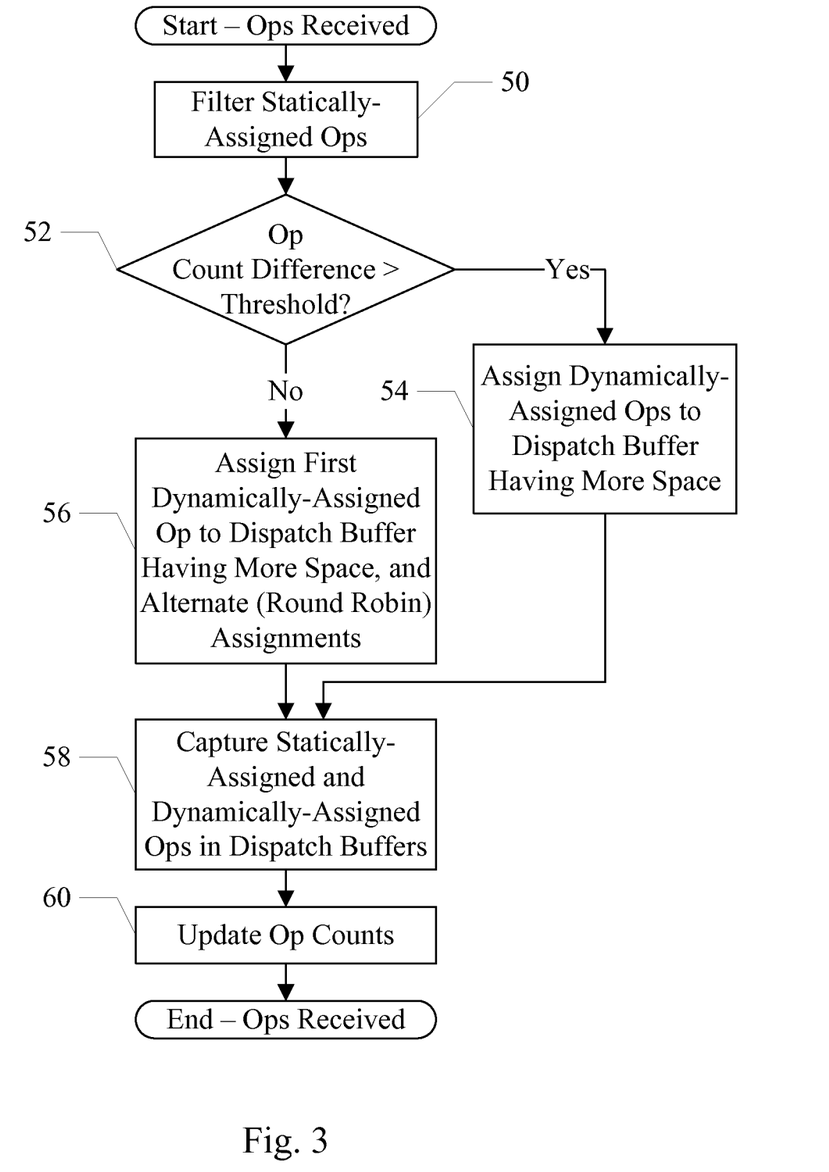
FIG. 3 is a flowchart illustrating operation of one embodiment of the dispatch unit in response to receiving ops from front end fetch/decode circuitry into a set of dispatch buffers.

Turning now to FIG. 3, a flowchart is shown illustrating operation of one embodiment of the dispatch unit 18 (and more particularly the dispatch buffer control circuit 40) in response to receiving one or more ops from the map unit 16. While the blocks are shown in a particular order for ease of understanding, other orders may be used. Blocks may be performed in parallel in combinatorial logic circuitry within the dispatch unit 18/control circuit 40. Blocks, combinations of blocks, and/or the flowchart as a whole may be pipelined over multiple clock cycles. The dispatch unit 18/control circuit 40 may be configured to implement the operation shown in FIG. 3.

The control circuit 40 may filter the statically-assigned ops (if any) from consideration, since these ops are allocated to their statically-assigned dispatch buffer without regard to relative fullness (block 50). In some embodiments, the statically-assigned ops may be considered as part of the op counts for the dispatch buffers to which they will be transmitted, which may alter the allocation of the dynamically-assigned ops. In other embodiments, the statically-assigned ops may not be considered as they will affect the op counts in the following cycle anyway. As long as ops are reasonably balanced on average, the performance may be similar to being more accurate.

The control circuit 40 may compare the op counts corresponding to the dispatch buffers 26A-26E that are eligible to receive the dynamically-assigned ops (decision block 52). For example, integer dynamically-assigned ops are eligible to be received by the dispatch buffers 26A-26B, so the op counts for these two dispatch buffers may be compared. If the op counts differ by more than the threshold programmed into the register 42A (decision block 52, "yes" leg), then the control circuit 40 may assign the dynamically-assigned ops to the dispatch buffer having relatively more space (block 54). That is, all of the dynamically-assigned ops may be provided to the dispatch buffer having relatively more space, to attempt to even out the distribution of the ops. On the other hand, if the op counts do not differ by more than the threshold (decision block 52, "no" leg), the control circuit 40 may assign the first dynamically-assigned op to the dispatch buffer having more space, and then alternate assignments among the eligible dispatch buffers for remaining dynamically-assigned ops. For example, integer dynamically-assigned ops may be ping-ponged between the dispatch buffers 26A and 26B, beginning with whichever one has the most available space. In this fashion, each time there is an odd number of integer dynamically-assigned ops, the dispatch buffer having relatively more space may receive more ops, tending to even the distribution of ops over time.

The control circuit 40 may cause the dispatch buffers to capture the dynamically-assigned ops as determined above, and the statically-assigned ops in the dispatch buffers to which they are statically-assigned (block 58). The control circuit 40 may also update the op counts based on the assigned ops (block 60).

Figure 4:
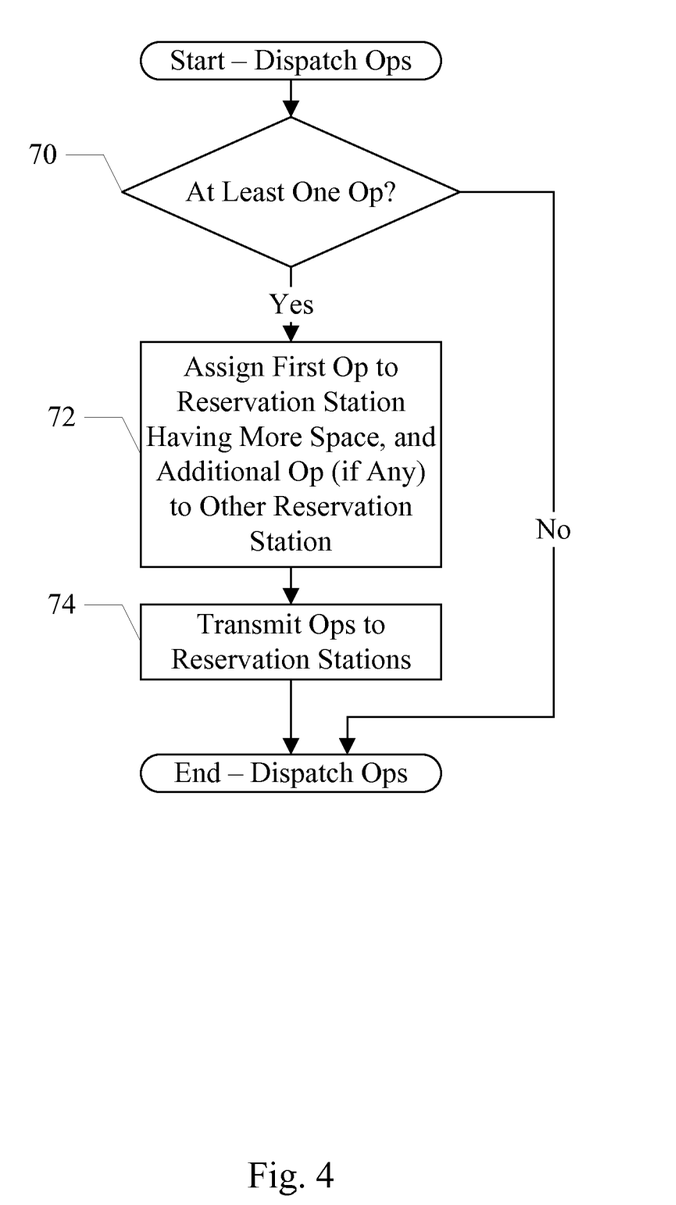
FIG. 4 is a flowchart illustrating operation of one embodiment of the dispatch unit in to transmit ops from dispatch buffers to reservation stations.

FIG. 4 is a flowchart illustrating operation of one embodiment of the dispatch unit 18 (and more particularly the dispatch buffer control circuit 40) to transmit ops from a dispatch buffer to its corresponding reservation stations. While the blocks are shown in a particular order for ease of understanding, other orders may be used. Blocks may be performed in parallel in combinatorial logic circuitry within the dispatch unit 18/control circuit 40. Blocks, combinations of blocks, and/or the flowchart as a whole may be pipelined over multiple clock cycles. The dispatch unit 18/control circuit 40 may be configured to implement the operation shown in FIG. 4. It is noted that, in some embodiments, the portion of the control circuit 40 which transmits ops from dispatch buffers 26A-26E to reservation stations 20A-20I may be physical distributed to each of the dispatch buffers 26A-26E. The control circuitry for each dispatch buffer 26A-26E may be independent of the other control circuitry for the other dispatch buffers 26A-26E.

If there is at least one op in the dispatch buffer awaiting transmission to a reservation station (decision block 70, "yes" leg), the control circuit 40 may select the first op (e.g. the oldest op in the dispatch buffer) and may assign the op to the reservation station have more space (more free entries), assuming the op is dynamically-assigned. If the op is statically-assigned, the control circuit 40 may assign the op to the correct reservation station. If there is a second op that is ready to be transmitted and is permitted to be transmitted to the other reservation station (i.e. the reservation station that was not selected for the first op), the second op may be assigned to the other reservation station (block 72). The dispatch buffer may transmit the selected ops to the assigned reservation stations (block 74). If the op counts in the control register 42B include counts per reservation station, the counts may be updated to reflect dispatch of the selected ops to the assigned reservation stations.

Figure 5:
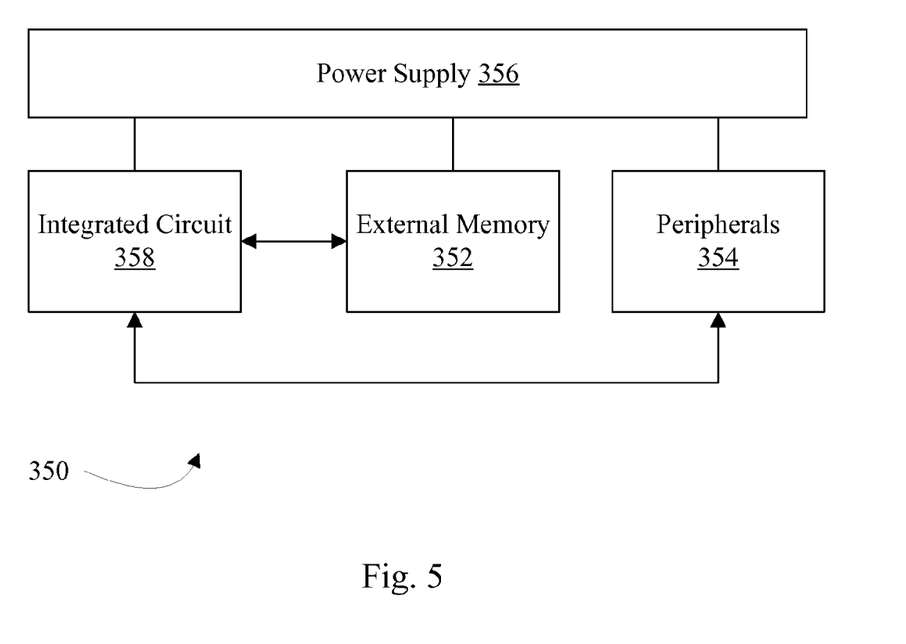
FIG. 5 is a block diagram of one embodiment of a system.

Turning now to FIG. 5, a block diagram of one embodiment of a system 350 is shown. In the illustrated embodiment, the system 350 includes at least one instance of an integrated circuit 358 coupled to an external memory 352. The integrated circuit 358 is also coupled to one or more peripherals 354. A power supply 356 is also provided which supplies the supply voltages to the integrated circuit 358 as well as one or more supply voltages to the memory 352 and/or the peripherals 354. In some embodiments, more than one instance of the integrated circuit 358 may be included (and more than one external memory 352 may be included as well).

The integrated circuit 358 may include one or more instances of the processor 10 shown in FIG. 1. In some embodiments, the integrated circuit 358 may include one or more instances of the processor 10 and one or more other components in a system on a chip (SOC) configuration.

The memory 352 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the integrated circuit 358 in a chip-on-chip configuration, a package-on-package configuration, or a multi-chip module configuration.

The peripherals 354 may include any desired circuitry, depending on the type of system 350. For example, in one embodiment, the system 350 may be a mobile device (e.g. personal digital assistant (PDA), smart phone, etc.) and the peripherals 354 may include devices for various types of wireless communication, such as wifi, Bluetooth, cellular, global positioning system, etc. The peripherals 354 may also include additional storage, including RAM storage, solid state storage, or disk storage. The peripherals 354 may include user interface devices such as a display screen, including touch display screens or multitouch display screens, keyboard or other input devices, microphones, speakers, etc. In other embodiments, the system 350 may be any type of computing system (e.g. desktop personal computer, laptop, workstation, net top etc.).

Numerous variations and modifications will become apparent to those skilled in the art once the above disclosure is fully appreciated. It is intended that the following claims be interpreted to embrace all such variations and modifications.

What is claimed is:

1. A processor comprising:
a decode unit configured to decode instructions and generate a plurality of instruction operations;
a plurality of reservation stations, each of the plurality of reservation stations coupled to a respective execution unit and configured to store instruction operations for issuance to the respective execution unit, wherein the plurality of reservation stations are configured to schedule the instruction operations for issuance responsive to availability of operands for the instruction operations; and
a dispatch unit coupled to the decode unit, wherein the dispatch unit includes a plurality of dispatch buffers, each of the plurality of dispatch buffers coupled to two or more of the plurality of reservation stations, wherein each dispatch buffer of the plurality of dispatch buffers is configured to store instruction operations to be dispatched to the two or more of the plurality of reservation stations coupled to that dispatch buffer, wherein the dispatch unit is configured to allocate instruction operations to the plurality of dispatch buffers responsive to a relative fullness of the plurality of dispatch buffers with respect to each other, wherein at least a first instruction operation of the plurality of instruction operations is allocated to a least full dispatch buffer of the plurality of dispatch buffers, and wherein each dispatch buffer is configured to dispatch instruction operations to the two or more of the plurality of reservation stations responsive to a relative fullness of the two or more of the plurality of reservation stations with respect to each other, wherein at least a second instruction operation is dispatched to a least full reservation station of the two or more reservation stations.

2. The processor as recited in claim 1 wherein a subset of the plurality of instruction operations are only executable on a subset of the respective execution units, and wherein the dispatch unit is configured to allocate instruction operations from the subset to a corresponding dispatch buffer of the plurality of dispatch buffers that is coupled to at least one of the subset of the respective execution units, wherein the dispatch unit is configured to allocate the instruction operations from the subset to the corresponding dispatch buffer independent of the relative fullness of the plurality of dispatch buffers.

3. The processor as recited in claim 1 wherein the dispatch unit is configured to measure the relative fullness of the plurality of dispatch buffers based on both a number of instruction operations in each of the plurality of dispatch buffers and a number of instruction operations in corresponding reservation stations of the plurality of reservation stations.

4. The processor as recited in claim 3 wherein the dispatch unit is configured to maintain a plurality of counts of instruction operations to measure the relative fullness of the plurality of dispatch buffers, each of the plurality of counts corresponding to a respective reservation station of the plurality of reservation stations, and wherein the dispatch unit is configured to update the each of the plurality of counts in response to dispatching instruction operations to the respective reservation stations.

5. The processor as recited in claim 4 wherein the dispatch unit is coupled to receive indications from each reservation station of the plurality of reservation stations that instruction operations have been issued by the reservation station, wherein the dispatch unit is configured to update the plurality of counts responsive to the indications.

6. The processor as recited in claim 1 wherein the dispatch unit further comprises an additional dispatch buffer that is coupled to only one of the plurality of reservation stations.

7. A method comprising:
  receiving a plurality of instruction operations in a dispatch unit of a processor, wherein the dispatch unit includes a plurality of dispatch buffers configured to store instruction operations for dispatch, each given dispatch buffer of the plurality of dispatch buffers coupled to a respective plurality of reservation stations to which the given dispatch buffer is configured to dispatch instruction operations, and each reservation station of the respective plurality of reservation stations further coupled to respective execution units configured to execute instruction operations, and wherein the plurality of instruction operations include one or more statically-assigned instruction operations and one or more dynamically-assigned instruction operations;
  allocating the dynamically-assigned instruction operations to corresponding dispatch buffers of the plurality of dispatch buffers responsive to a fullness measure corresponding to each given dispatch buffer relative to other dispatch buffers of the plurality of dispatch buffers, wherein the fullness measure includes instruction operations in the respective plurality of reservation stations as well as instruction operations in the given dispatch buffer; and
  transmitting the dynamically-assigned instruction operations to the corresponding dispatch buffers and the statically-assigned instruction operations to dispatch buffers to which the statically-assigned instruction operations are assigned.

8. The method as recited in claim 7 further comprising filtering the statically-assigned instruction operations to identify the dynamically-assigned instruction operations.

9. The method as recited in claim 7 wherein the allocating comprises allocating a first dynamically-assigned instruction operation to a first corresponding dispatch buffer that is least full according to the fullness measure.

10. The method as recited in claim 9 wherein the allocating comprises allocating a second dynamically-assigned instruction operation to a second corresponding dispatch buffer.

11. The method as recited in claim 10 wherein the allocating comprises allocating a third dynamically-assigned instruction operation to the first corresponding dispatch buffer.

12. The method as recited in claim 9 wherein the allocating further comprises allocating additional dynamically-assigned instruction operations to dispatch buffers in a round robin fashion.

13. A dispatch unit comprising:
  a plurality of dispatch buffers, each dispatch buffer of the plurality of dispatch buffers coupled to two or more reservation stations of a plurality of reservation stations, and each of the plurality of dispatch buffers coupled to receive a plurality of instruction operations to be dispatched to the plurality of reservation stations; and
  a control circuit coupled to the plurality of dispatch buffers, wherein the control circuit is configured to distribute the plurality of instruction operations over the plurality of dispatch buffers, wherein the control circuit is configured to select a given dispatch buffer to receive a given instruction operation of the plurality of instruction operations, wherein the given dispatch buffer is one of two or more of the plurality of dispatch buffers that are eligible to receive the given instruction operation, and wherein the control circuit is configured to select the given dispatch buffer responsive to a total number of instruction operations in the given dispatch buffer and in corresponding reservation stations being lower than the total number of instruction operations in each other dispatch buffer of the two or more of the plurality of dispatch buffers and in corresponding reservation stations of the plurality of reservation stations.

14. The dispatch unit as recited in claim 13 wherein the control circuit is configured to compare the total number for each of the two or more of the plurality of dispatch buffers to select the given dispatch buffer.

15. The dispatch unit as recited in claim 14 wherein the control circuit is configured to detect that a difference in the total number between the total numbers for each of the two or more of the plurality of dispatch buffers exceeds a threshold, and wherein the control circuit is configured to select the given dispatch buffer to receive each of the plurality of instruction operations for which the given dispatch buffer is eligible in response to the difference exceeding the threshold.

16. The dispatch unit as recited in claim 13 wherein a second instruction operation of the plurality of instruction operations is restricted to a particular dispatch buffer of the plurality of dispatch buffers, and wherein the control circuit is configured to select the particular dispatch buffer to receive the second instruction operation even in a case that another dispatch buffer has a lower total number.

17. The dispatch unit as recited in claim 13 wherein the control circuit is configured to identify a first instruction operation in a first dispatch buffer that is to be dispatched, and wherein the control circuit is configured to dispatch the first instruction operation to a selected reservation station of the two or more reservation stations to which the first dispatch buffer is coupled responsive to the selected reservation station storing fewer instruction operations than other ones of the two or more reservation stations.

18. The dispatch unit as recited in claim 17 wherein the control circuit is configured to identify a second instruction operation in the first dispatch buffer that is to be dispatched, and wherein the control circuit is configured to dispatch the second instruction operation to a different one of the two or more reservation stations than the selected reservation station.

19. A processor comprising:
  a dispatch unit comprising a plurality of dispatch buffers coupled to receive a plurality of instruction operations;

a plurality of integer reservation stations, wherein each of the plurality of integer reservation stations is coupled to receive integer instruction operations from only one of the plurality of dispatch buffers, and wherein at least two dispatch buffers of the plurality of dispatch buffers are coupled to non-overlapping subsets of the plurality of integer reservation stations;

a plurality of integer execution units coupled to the plurality of integer reservation stations, wherein each of the plurality of integer execution units is configured to execute a plurality of integer instruction operations, and wherein the dispatch unit is configured to distribute integer instruction operations in the plurality of instruction operations to the at least two dispatch buffers responsive to a number of instruction operations in each buffer and a number of instruction operations in corresponding subset of the plurality of integer reservation stations, relative to each other.

20. The processor as recited in claim 19 wherein a subset of the plurality of integer execution units include branch execution circuitry, and wherein the subset of the plurality of integer execution units are coupled to a subset of the plurality of integer reservation stations, and wherein the subset of the plurality of integer reservation stations are coupled to a first dispatch buffer of the plurality of dispatch buffers, and wherein the dispatch unit is configured to restrict branch instruction operations to the first dispatch buffer.

21. The processor as recited in claim 19 wherein a first integer execution unit of the plurality of integer execution units includes a multiplier, and wherein the first integer execution unit is coupled to a first integer reservation station of the plurality of integer reservation stations, and wherein the first integer reservation station is coupled to a first dispatch buffer of the plurality of dispatch buffers, and wherein the dispatch unit is configured to restrict multiply instruction operations to the first dispatch buffer.

22. The processor as recited in claim 19 wherein a first integer execution unit of the plurality of integer execution units includes a divider, and wherein the first integer execution unit is coupled to a first integer reservation station of the plurality of integer reservation stations, and wherein the first integer reservation station is coupled to a first dispatch buffer of the plurality of dispatch buffers, and wherein the dispatch unit is configured to restrict divide instruction operations to the first dispatch buffer.

23. The processor as recited in claim 19 further comprising:
  a plurality of load/store reservation stations coupled to a first dispatch buffer of the plurality of dispatch buffers; and
  a plurality of load/store execution units coupled to the plurality of load/store reservation stations.

24. The processor as recited in claim 23 further comprising:
  a plurality of floating point reservation stations coupled to a second dispatch buffer of the plurality of dispatch buffers; and
  an additional floating point reservation station coupled to a third dispatch buffer of the plurality of dispatch buffers; and
  a plurality of floating point execution units coupled to the plurality of floating point reservation stations and the additional floating point reservation station.

\* \* \* \* \*